United States Patent

Thomas

[15] 3,686,441

[45] Aug. 22, 1972

[54] TDM FAULT DETECTOR

[72] Inventor: David M. Thomas, Bayshore, Ottawa, Canada

[73] Assignee: International Standard Electric Corporation, New York, N.Y.

[22] Filed: Sept. 15, 1970

[21] Appl. No.: 72,269

[30] Foreign Application Priority Data

Sept. 24, 1969 Great Britain..........47,364/69

[52] U.S. Cl. ........................179/15 BF, 179/175.2 R

[51] Int. Cl...............................................H04j 3/14

[58] Field of Search ..179/15 BF, 18 J, 175.2, 175.25

[56] References Cited

UNITED STATES PATENTS

| | | | |
|---|---|---|---|
| 3,499,994 | 3/1970 | Lord | ..................179/175.2 R |
| 3,493,683 | 2/1970 | Schlichte | ..............179/15 BF |

*Primary Examiner*—Ralph D. Blakeslee

*Attorney*—C. Cornell Remsen, Jr., Walter J. Baum, Percy P. Lantzy, J. Warren Whitesel, Delbert P. Warner and James B. Raden

[57] ABSTRACT

A time division multiplex fault detector employs certain time slots in each multiple's frame to test the highways and gates as well as to set storage elements which control the systems and other circuits.

3 Claims, 4 Drawing Figures

Inventor
D. M. THOMAS
By [signature]
Attorney

TDM FAULT DETECTOR

This invention relates to automatic telecommunication exchanges, in which connections are set up in time division multiplex manner.

According to the invention there is provided an automatic telecommunication exchange in which communication connections are established in time division multiplex manner, in which incoming and outgoing multiplex highways can be interconnected via static electrical switching devices, in which the multiplex frame includes time slots used for the establishment of said communication connections and time slots not used for the establishment of said connections, and in which means is provided to test said highways and said switching devices during the time slots not used for the establishment of connections, so that said testing can be effected without interference with said connections.

Figure 1:
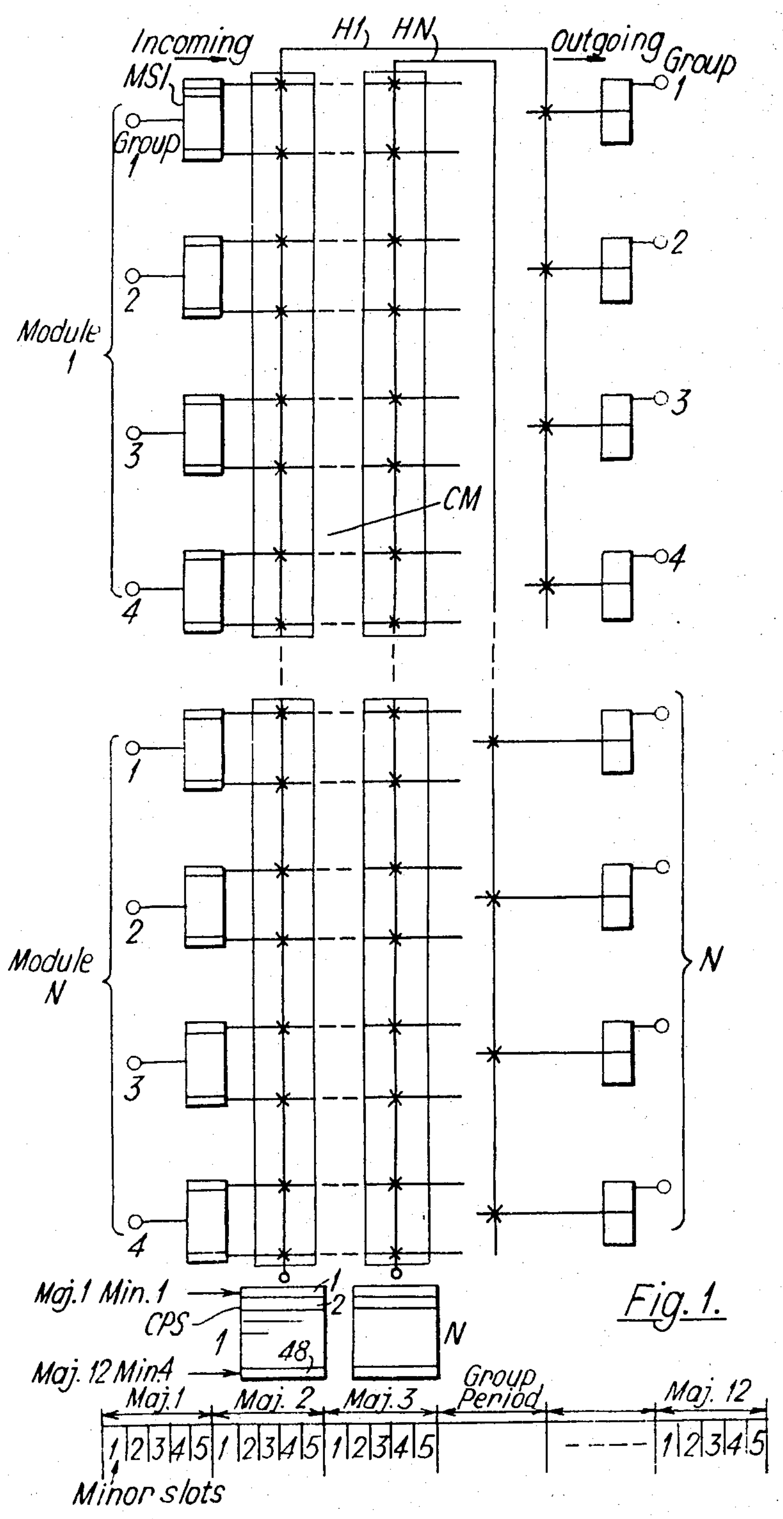
Figure 2:
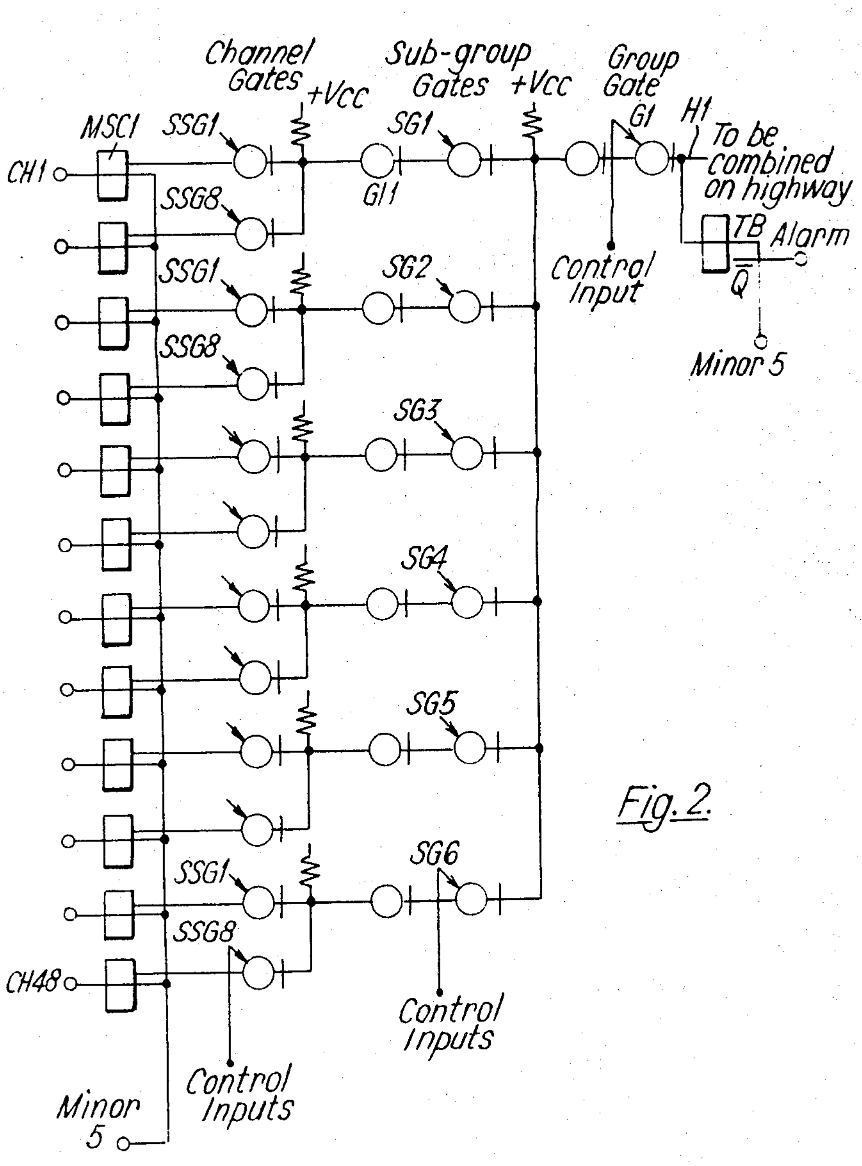
Figure 3:
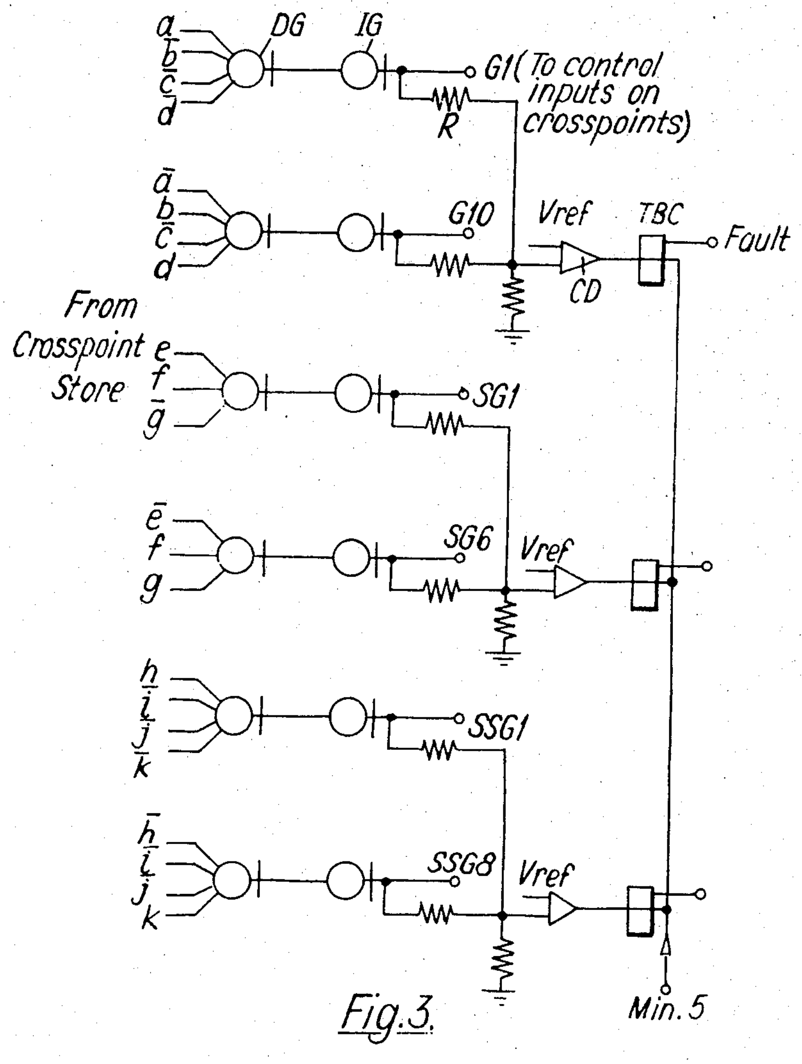
Figure 4:
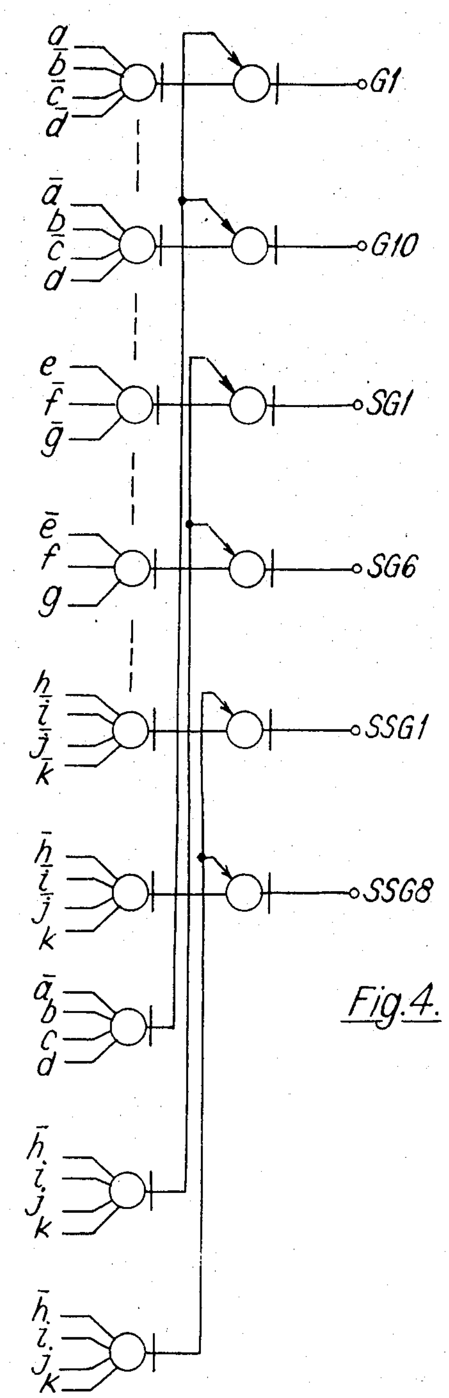

An embodiment of the invention will now be described with reference to the drawings, in which FIG. 1 shows schematically as much as is necessary to understanding this invention of a telephone exchange to which the invention may be applied, FIG. 2 shows short-circuit detection arrangements for cross-point devices of and exchange as shown in FIG. 1, FIG. 3 shows a decoder and distribution gates for detecting open-circuited cross-point devices, and FIG. 4 is a further arrangement of a decoder with control grouping.

The invention is described as applied to a multi-highway exchange of the so-called TS type, that is, an exchange in which, in effect, time switching and space switching occur one after the other. The exchange of FIG. 1 is a multi-highway arrangement of this type, with cross exchange highways, such as highways H1 and HN.

Incoming trunk groups, each being a time division multiplex (TDM) highway, are connected to the incoming side of the switching stage, each highway having associated with it a message store such as MS1 in which incoming intelligence is staticised. Each of the stores serving one multiplex highway has a number of storage positions equal to the number of time division channels on its highway, and in the present case each highway can convey twelve TDM channels, each message store has twelve positions.

The received intelligence is in a form of coding known as sigma-delta coding, in which each element of information which occurs at one time slot is a 1 or a 0 to indicate whether the amplitude of the speech sample is greater than or less than it was on the previous sampling.

The various storage compartments of the message stores are each connected by normally non-operated static switching devices, i.e. electronic gates, to all of the highways H1 to HN, which gates are indicated by little crosses. In addition, each of the highways H1 to HN is connected to a group of outgoing multiplex highways. In the exchange shown there are the same number of incoming multiplex highways and outgoing multiplex highways, although this would not always be so. Each outgoing highway is shown as having a temporary store into which a pulse representing a speech sample is placed for transmission outside of the exchange.

Each of the highways within the exchange can handle all of the communication connections for a complete group of outgoing highways, the various speech slots being interleaved on the cross-exchange highways. Thus, see the timing diagram at the foot of FIG. 1, it will be seen that there are 12 major time slots MAJ1 to MAJ12, each subdivided into five minor time slots, the first four of which are used for communication connections. The fifth minor time slot within each major slot is used, as will be seen later, for a number of functions, including writing into and reading out of certain of the stores, and also the test operations. Each cross-exchange highway is controlled by a cross-point control store such as CPS, with 48 storage compartments, each designated by a major and a minor time slot, the first of which is designated MAJ1 MIN1 and the last MAJ12 MIN4. When a connection has been set up, the contents of the message store for that connection's incoming highway are switched by cross-point gates onto the cross-exchange highway which functions in "super multiplex" manner, at time slot times defined by the cross-point control stores, and then into the 12-channel outgoing highways via further gates which are, in effect, demultiplexers. In this arrangement the gates between the cross-exchange highways and the outgoing highways are operated cyclically with a total cycle time of one frame period, so that each highway is connected to its cross-exchange highway at the time slots within the group period appropriate to it. When a connection has been set up the cross-point store for the highway via which that connection is set up has in its compartment appropriate to the outgoing highway and time position to be used the address of the incoming message store from which intelligence is to be switched. Thus it will be seen that a received pulse is stored temporarily in a message store section, and then is switched therefrom to a cross-exchange highway and from the cross-exchange highway to an outgoing highway, in both cases at the time position in the multiplex cycle appropriate to the outgoing highway.

From the above it will be seen that an outgoing multiplex channel is uniquely defined by a highway such as H1, a major slot (channel time) and a minor slot, the incoming channels being uniquely defined by the addresses of their message stores. Associated with each of the 48 defining slot times is a row of the connection storage such as indicated at CPS, which is addressed at the slot times for the connections, each such connection being set up by writing the address of the incoming channel into the appropriate row of the store such as CPS. The fifth minor slot in every major slot is used for writing the incoming channel information into these stores, and during this period no information is switched across the office. It is these fifth minor slots which are used for the test operations.

If as is usually the case, the cross-point devices of FIG. 1 each consist of a single logic gate with their outputs combined in an OR-function without further gating, then a short-circuit failure of one of these cross-point gates would disable the complete cross-exchange highway. By combining the cross-points in a 48 channel module, FIG. 2, and as indicated at CM in FIG. 1, the problem can be alleviated since only a short-circuit in the final output gate G will affect the complete highway.

In FIG. 2 the channels are indicated on the left hand side at CH1 to CH48, with each of which there is associated a compartment of a message store such as MSC1, the channels being connected to the highway such as H1 via three stages of gates arranged as a tree-like network. These gates consist of channel gates such as SSG1, sub-group gates such as SG1, and group gates such as G1. The additional gates in FIG. 2, such as GI1, are necessary because the gates used are of the inverting variety.

The quiescent logical state of the group gate G1 is logical 1 (assuming positive logic), so a short-circuit can be detected simply by examining the output of this gate at the fifth minor slot period when no traffic is switched across the exchange. The detection mechanism consists therefore of one bistable TB clocked at the slot time minor five. Under non-fault conditions this bistable is set with its output Q high, assuming that the bistable is an integrated circuit bistable, preferable of the JK type. If the output gate G1 short-circuits permanently, TB is reset, and its output Q goes low; this can be used to light a lamp or be fed directly to the switch control which switches out the entire highway and gives an alarm signal.

If the short-circuit fault is transitory and removes itself, the bistable immediately sets itself, and the alarm is stopped. Preferably alarms, in addition to being audible or visible to maintenance personnel, are recorded, so that it is possible to obtain an indication of the rate at which such transitory faults occur.

Failure of one of the sub-group gates such as SG1 in the short-circuit mode removes from service the particular 48 channel module, denying incoming channels served by this module access to those outgoing channels on the highway which this module serves. Such faults can be detected in exactly the same way by combining the group gate outputs with the sub-group gate outputs in an "OR" function, and monitoring at minor slot 5. In FIG. 2, this would necessitate 6 sub-group monitoring bistables, each generally similar to the bistable TB, and each associated specifically with an output of one of the sub-group gates such as SG1.

Another form of fault which is likely to occur is one due to a cross-point control input failure. Thus, referring to FIG. 2, if one of the inputs to the group gate G1, or to any one of the sub-groups SG, or the channel gates SSG1, fails in the short-circuit mode, then the appropriate group of cross-points or single cross-point in the case of a channel gate fails to operate. In such a case the associated channel or channels are denied access to the highway served by the cross-point module. However, if one of the control inputs should fail in the open circuit mode, the associated gate is permanently open, because of the nature of the gates used. Hence double connections could result in which an outgoing channel receives the correct incoming channel intelligence, together with that from another, and normally incorrect, channel. Such failures can occur due to a fault on either the input to the cross-point gate or the input or output of the gate which distributes the control inputs from the decoder (not shown) in the cross-point control module. This latter module is not shown. The decoder referred to above receives the contents of the connection store and translates therefrom the address of the cross-point to be operated, together with the identities of the sub-group gate and group gate which also have to be operated. This decoder is shown schematically in FIG. 3, which also shows the distribution gates with open-circuit detection.

Since no traffic is switched across the office during each of the fifth minor slots, the outputs of the decoder distribution gates are always at logical 0 at this time, so that the associated cross-point gates should then be non-operated. Therefore an open-circuit fault on the control inputs to these gates can be detected by monitoring for a logical 1 at minor time position 5. To save gates, this can be performed by analogue addition of the output voltages from the decoder distribution gates, together with a strobed differential comparator, as in FIG. 3. The analogue addition can be done by a current summing resistor as shown in this figure.

In FIG. 3 the decoder gates are indicated at DG, each of which has a number of inputs from the associated cross-point store (see FIG. 1) and an output via an inverting gate such as IG to the controlled one of the gates in FIG. 2. The analogue summing resistors are connected as shown, to the lower-most inputs of the comparator devices such as CD, each of which can be an operational amplifier, available in integrated circuit form. The outputs of these comparators feed further test bistables such as TBC, whose operation is similar to that of the operation of the test bistable TB, in FIG. 2.

In the above description integrated circuits are mentioned as they are much used in the exchange described. A common failure of integrated circuits is that one lead in the wire between the gate input on the silicon chip and the pin on the package breaks. This causes an open circuit, which with the gating used appears as a logical 1 on the gate input, and this fault cannot be detected by examining the logical state on the corresponding pin, which is free to follow the output state of the decoder connected to that pin. This assumes for the moment that the gate in question is one of the gates such as DG, which is fed from the decoder. To detect this fault, a test channel on the switch is used, which channel may be a dedicated test channel, i.e. a test channel reserved solely for fault detection, or may, and in many cases preferably, be a normal traffic channel not at the time of the test being used for conveying traffic. Means are supplied to extract the contents of this channel from its outgoing highway on the switch under control of the switch-controlling processor, and to examine a number of bits in this channel either by hard-ware or soft-ware. Such means are commonly used in systems with TDM switches.

The detection of a double-connection fault is performed by specifying, in the connection store row for the test channel, the address of only two of the three gates required to switch any channel onto a highway. If a double connection fault has occurred on the third, and undefined, gate, the contents of the corresponding channel will be switched into the test channel and can be identified as information by examining, for example, 10 bits, in which time the probability of there being two different logical conditions on a busy channel will be very high.

One such instruction in the connection store will detect a double connection of the group gate of any cross-point module in a given highway. For example the word 0000, 001, 0001 will operate the control inputs SG1, SSG1 on every cross-point module (see FIG. 2) on the highway under test. If one of the group gate control inputs on the highway is open circuit, the corresponding channel is switched onto the highway and into the test channel. If this channel is busy, the false connection will be detected by the presence of information in the test channel.

In a similar way a further test word 0001, 000, 0001, operates the control inputs for the gates G1, SSG1. If any sub-group control input on group one is high, the corresponding channel is switched onto the cross-exchange highway. To test all of the cross-point modules on a highway would therefore require ten instructions of this nature for a 10-module highway, each module having to be addressed individually.

To test the channel control inputs such words as 0001, 001, 0000 are required, and each sub-group in every group must be tested individually, which requires a total of sixty instructions of a 10-module switch.

Thus testing a complete 10-highway, 480-channel switching arrangement of the type shown in FIG. 1, needs 710 instructions. Further, as some of the channels switched onto the highways are busy at the time that the test is effective, the probability of detecting a double connection at the end of this procedure will be less than unity. That is, where a channel is busy, there is the risk that a double connection will fail to be detected.

However, by using two additional codes in the cross-point store it is possible to open all group and sub-group gates on a highway simultaneously. This is effected in the manner described with reference to FIG. 4, where the hardware detection equipment, i.e. the differential amplifiers and bistables such as shown in FIGS. 2 and 3, have been omitted to simplify the drawing. To test all sub-group gates on a highway, the word 1110, 000, 1100 is written into the test channel store. The first portion 1110 of this code causes every channel gate on the highway to open. The last portion 1100 causes every group gate to open so that if any sub-group gate is permanently open the contents of the appropriate sub-group will be combined onto the highway and switched to the test channel. The probability of one of these channels being in a non-quiescent logic state at least once during, for example, a 10-bit period is eight times better than the probability of one channel being busy, so the risk that a double connection fault of this type is not detected is lessened as compared with the other method. As a result, such a fault will be detected more rapidly.

To test all of the channel gates on a highway, the test word 1110, XXX, 1110 is written into the test channel store. In this word the second portion is represented by XXX because its meaning is quite irrelevant as far as this stage of operation is concerned. This test word causes all the group and sub-group gates on a highway to open, and if any channel gate is open due to a fault, this channel will be gated onto the highway and detected in the test channel if busy. If the channel is free, then a double connection on it does not matter. In a similar way one can test all group gates by a test word with portions to open all sub-group and channel gates so that if any group gate is open, a signal is gated onto the highway and detected in the test channel.

Thus it will be seen that the total number of instructions required to test the complete 480-channel switch using this method is only 30, which compares favorably with the 710 instructions required by the other method, and also results in a greater probability of detecting double connections.

It will be appreciated that although the second described "software" technique for fault detection would normally be preferred to the first method, there may be circumstances in which the first, and apparently not so good, method may be preferred.

I claim:

1. An automatic telecommunication exchange, in which communication connections are established in time division multiplex manner, said exchange including incoming and outgoing multiplex highways each accommodating *n* multiplex channels, a plurality of cross-exchange highways each of which can interconnect a number *m* of said incoming highways and a number *m* of said outgoing highways via static electrical switching devices, control means associated with said highways whereby the channels on *m* of said highways are interleaved for transmission over said cross-exchange highways, so that a said cross-exchange highway can handle *m* times as many connections as can an incoming or outgoing highway, timing means for defining a multiplex cycle in which each frame includes *n* time slots used for other than communication connections, and test means adapted to test said cross-exchange highways and said switching devices, said test means including controls causing the test means to be operable only during the time slots used for other than communication connections, so that said highways and said switching devices can be tested without interfering with the connections.

2. An exchange as claimed in claim 1, in which each group of incoming highways is connected to one of said cross-exchange highways via a network of gates controlled by said timing means, said network being of tree-like structure, in which to test whether any gate in one of the stages of the tree network is incorrectly open all gates in all other stages are opened during a said testing time slot, in which if any such gate is open a bistable device associated therewith operates to indicate that its gate is incorrectly open and in which this operation is repeated for all stages of the tree-like network.

3. An exchange as claimed in claim 2, in which the gates used are of the inverting type and in which to detect an open circuit fault on one of said gates its output condition is monitored during a test time position.

* * * * *